United States Patent [19]

Eppich

[11] 4,036,430
[45] July 19, 1977

[54] MANUALLY OPERABLE CARD READER

[75] Inventor: Helmut Eppich, West Vancouver, Canada

[73] Assignee: Ebco Industries, Ltd., Richmond, Canada

[21] Appl. No.: 686,244

[22] Filed: May 13, 1976

[51] Int. Cl.² .............................................. G11B 25/10
[52] U.S. Cl. .................................. 235/61.11 E; 271/9
[58] Field of Search ................. 235/61.11 R, 61.11 E, 235/61.11 D, 61.6 R, 61.7 B; 194/4 G, 4 E; 200/46; 250/569; 271/9; 221/92

[56] References Cited

U.S. PATENT DOCUMENTS

| 3,456,117 | 7/1969 | Ritzert et al. | 235/61.11 E |
|---|---|---|---|
| 3,582,617 | 6/1971 | Berler | 235/61.11 E |
| 3,588,379 | 6/1971 | Young et al. | 271/9 |
| 3,621,265 | 11/1971 | Berler | 235/61.11 E |
| 3,936,042 | 2/1976 | Smith et al. | 271/9 |

Primary Examiner—Vincent P. Canney
Attorney, Agent, or Firm—Christensen, O'Connor, Garrison & Havelka

[57] ABSTRACT

A manually operated card reader for reading punched data recorded on a standard sized tabulation card and for reading punched data recorded on an appropriately sized identification badge or card is disclosed. Data is read from the standard sized tabulation card when the card is inserted in a first opening and conveyed through a curved passageway by manually pulling the card from a second opening. Data is read from the identification badge or card when the badge is inserted in the second opening and then withdrawn. In either case, the punched data is detected by an array of optical sources and optical sensors mounted along the opposite walls of the passageway near the second card opening. A pair of rollers, mounted between the first and second card openings, turn freely to permit pulling the standard tabulation card from the second card opening. If the card is pulled back toward the first opening, the rollers are wedged between the card and an inclined plate to frictionally engage the card and prevent card movement toward the first opening to prevent a second reading of data columns. A portion of the passageway located between the rollers and the optical reading station is configured to abut the end of a badge or card inserted through the second opening to stop such a badge from travelling through the passageway more than a predetermined distance. This badge stop mechanism does not impair the movement of a card through the passageway when the card is inserted through the first opening and pulled from the second opening. The card reader is constructed with two molded plastic plates that interlock to define the card openings and the passageway. The badge stop mechanism, the mounting arrangement for the rollers and the mounting arrangement for the optical reading apparatus are molded integral portions of the two plates. The optical sources and sensors and the rollers are retained in the molded plastic plates without the use of conventional fasteners such as screws. Structural cooperation between the contour of the curved passageway, the rollers and the badge stop mechanism exert frictional forces on a tabulation card pulled through the passageway such that operation of the card reader to read the punched data requires a positive manual force.

25 Claims, 8 Drawing Figures

U.S. Patent   July 19, 1977   Sheet 1 of 3   4,036,430
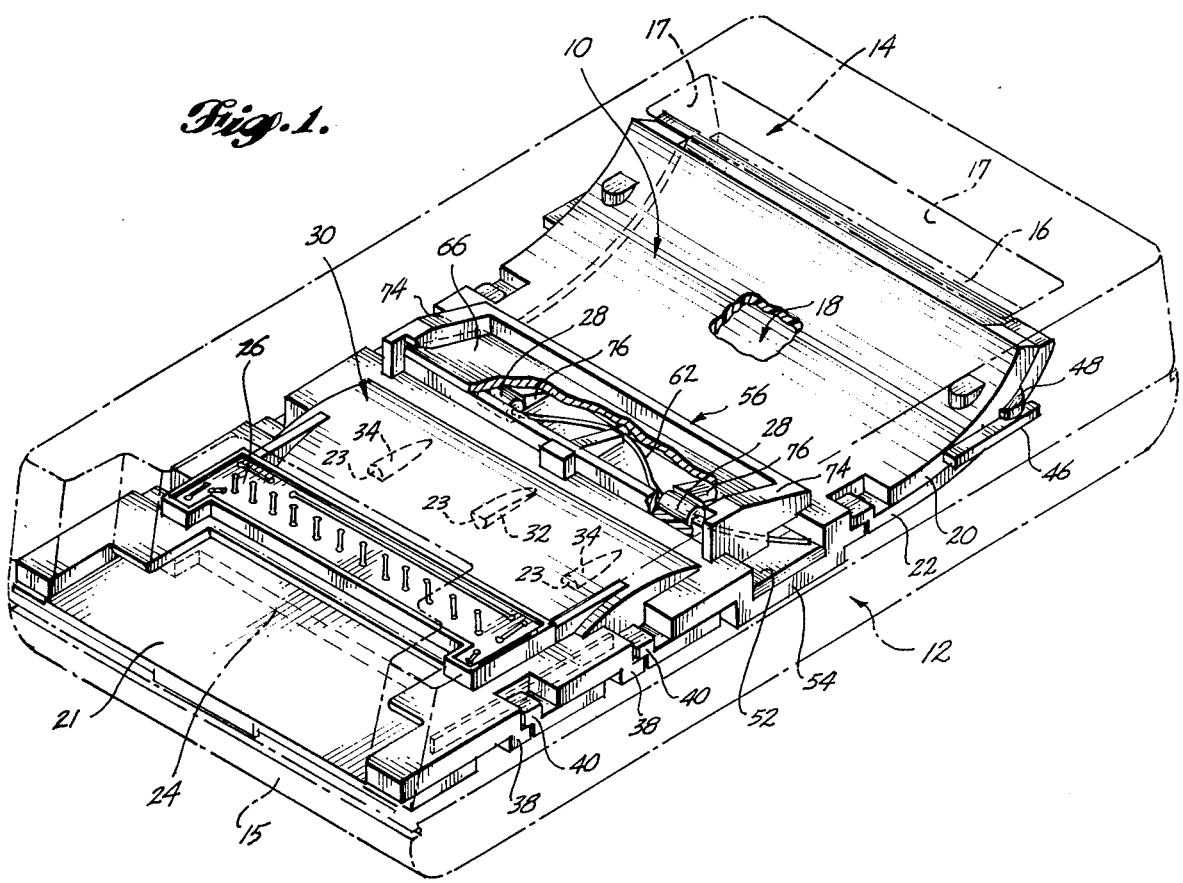
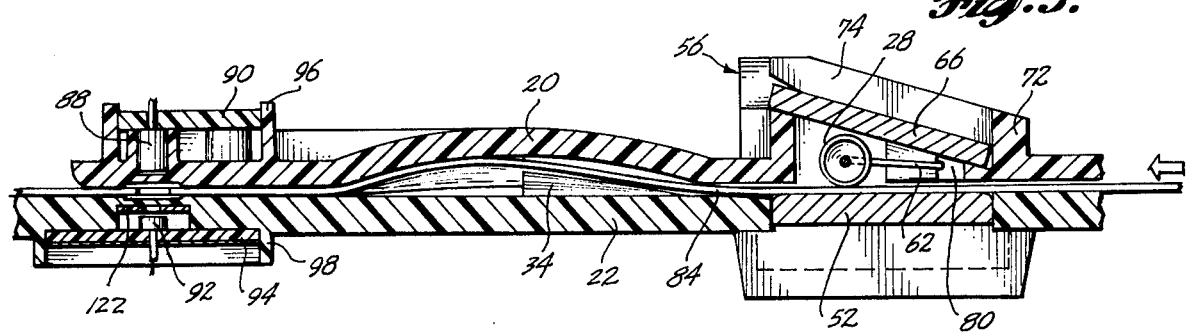
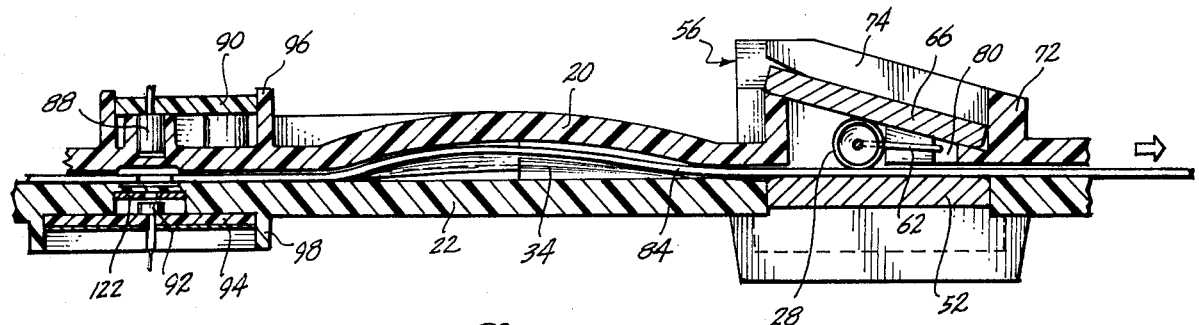

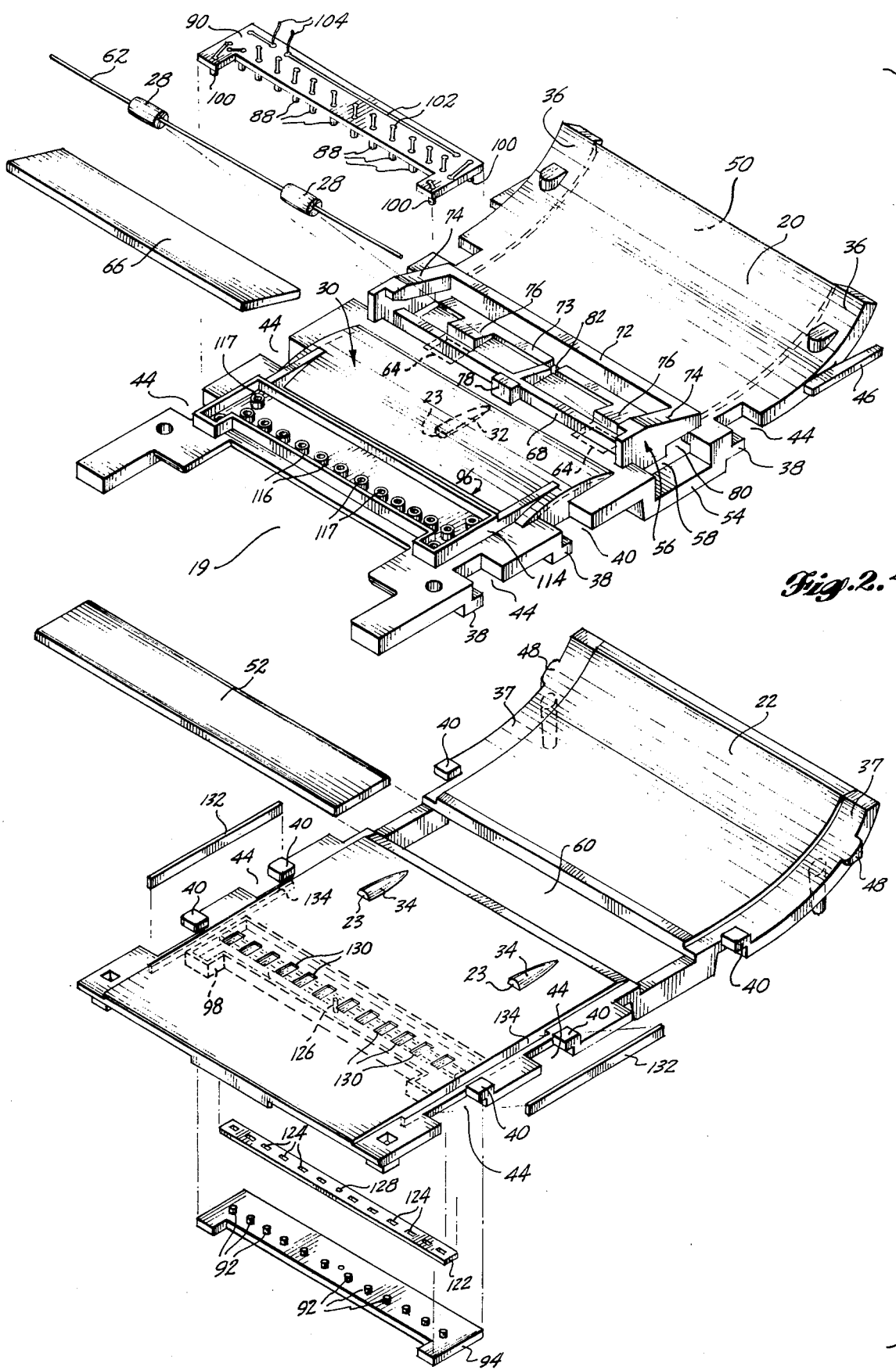

U.S. Patent July 19, 1977 Sheet 3 of 3 4,036,430
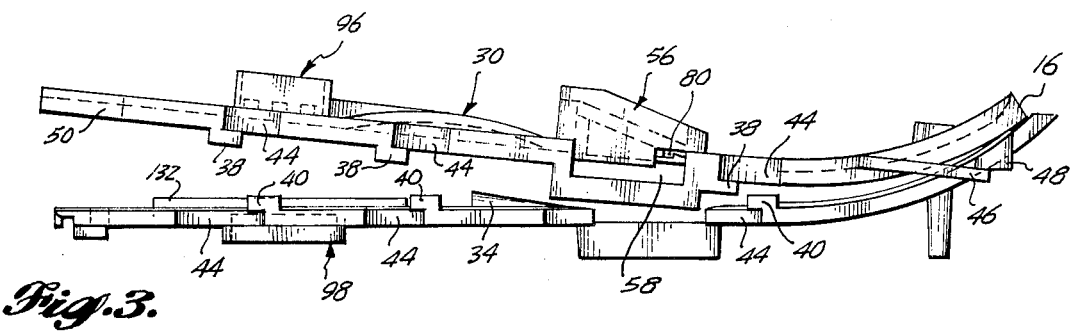
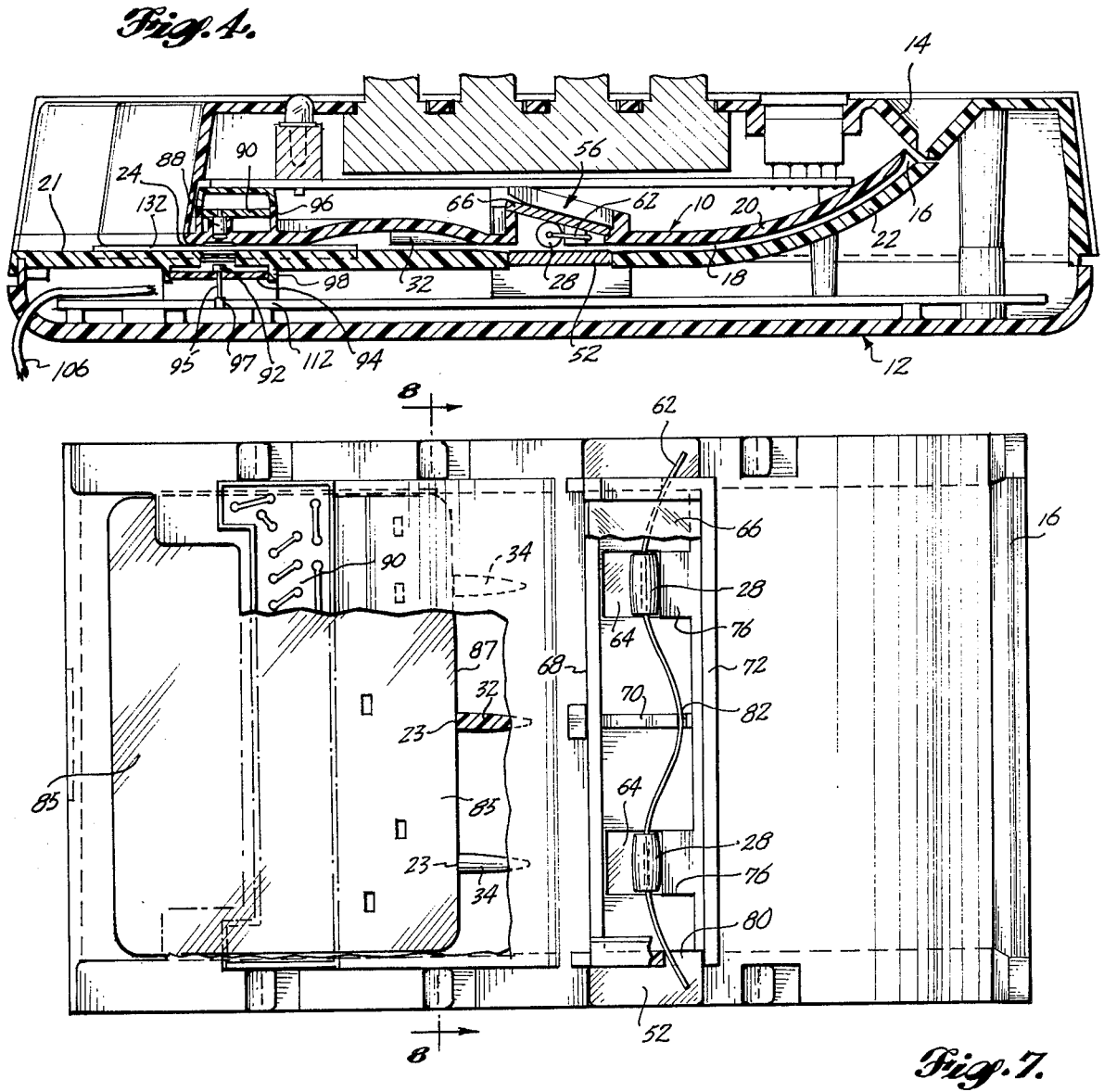
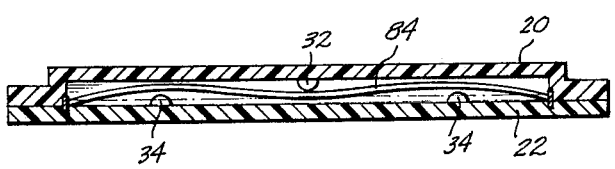

MANUALLY OPERABLE CARD READER

BACKGROUND OF THE INVENTION

This invention relates to apparatus for reading data from record forms. More particularly, it relates to a manually operated card reader for sequentially reading successive columns of holes or light transmitting areas of two differently dimensioned record forms, such as a standard sized tabulation card and a differently dimensioned identification badge.

The use of cards containing data recorded thereon in the form of punches or perforations is well known. Generally, such cards include a number of columns and rows with data punches being placed in the various row locations of a column to form a coded data word. For example, one such card commonly used in connection with electronic data processing systems is a standard-sized tabulation card having 80 columns and 12 rows. In some applications, fewer than 80 data words are required and a card the size of the standard tabulation card is not advantageous. For example, there is a growing use of personnel identification cards such as those worn or carried by the employees of a particular business for identification purposes. Often, it is advantageous to include stored data on such identification cards and use the cards in automatic machines that can include systems for the keeping of business records or systems for controlling access to specific areas or machines. Accordingly, it can be recognized that it is advantageous to provide card reading apparatus capable of reading data from differently configured cards.

Apparatus for reading punched data cards are generally classified as static card readers, in which data is simultaneously read from each card column, or dynamic card readers, in which the card columns are successively read as the card is moved relative to a reading station that includes means for sensing the coded pattern of punches. With respect to prior art dynamic card readers, the necessity of maintaining the card in rather precise alignment with the punch sensing elements while moving the card and sensing elements relative to one another has often resulted in a rather complex mechanical apparatus having a number of precision parts. Such complexity is undesirable since it prevents the card reader from being manufactured economically and decreases the reliability of the device. Further, most prior art card readers are arranged to read data from a single size of card. Hence, different apparatus is normally necessary for each size of card to be utilized even though the data is recorded in the same format with each data column representing a coded data word. Although two or more card readers configured to handle cards of different sizes can be included with a single housing to somewhat reduce production costs, the use of different apparatus to read differently sized cards greatly increases production costs and lowers the system reliability since failure of one of the card readers may render systems that utilize data from each size of card totally inoperative.

Accordingly, it is an object of this invention to provide a card reader of relatively simple construction for accurately reading the successive data columns of a punched card.

It is another object of this invention to provide a dynamic card reader configured for alternatively reading punched data from a standard tabulation card or a differently dimensioned card or badge.

It is still another object of this invention to provide a manually operated card reader for successively reading the data columns of a punched card wherein the card reader has a minimal number of moving mechanical parts.

It is yet another object of this invention to provide a manually operated card reader that can be assembled without the use of conventional fasteners such as screws so that the card reader can be easily assembled during manufacture and easily disassembled for any required maintenance.

SUMMARY OF THE INVENTION

These and other objects are achieved in accordance with this invention by a dynamic card reader that includes a curved passageway having a width commensurate with the columnwise dimension of a standard data tabulating card and a height that exceeds the card thickness. The length of the passageway is somewhat less than the length of a standard tabulation card. Thus, during the insertion of such a card through a first opening in one end of the passageway, the leading edge of the card emerges from a second opening in the other end of the passageway. The card is then grasped by the operator and pulled through the passageway. An aligned array of optical sources and sensors are mounted on the opposite sides of the passageway near the second card opening such that as the card is pulled from the second opening, each data location with a card column simultaneously passes between an optical source and an optical sensor to supply an electrical output signal.

In accordance with this invention, the tabulation card, once inserted in the first opening and pushed into the passageway cannot be withdrawn by pulling the card back through the first opening. Thus, the tabulation card can only move past the optical reading devices in a single direction and a multiple reading of the data recorded in the card columns is eliminated. In the preferred embodiment, the means for limiting the travel of the tabulation card to a single direction includes a pair of spring-loaded rollers mounted along the card passageway at a position between the first card opening and the optical sensing devices. The rollers are arranged to contact the upper surface of the card and rotate freely when the card is pulled from the second opening. If the card is pulled in the reverse direction in an attempt to withdraw the card from the first opening, the frictional forces between the surface of the rollers and the surface of the card cause the rollers to wedge between the card surface and the lower surface of a plate that is mounted to angularly extend above the rollers. When the rollers wedge between the card surface and the plate, the force exerted on the card prevents the card from being withdrawn through the first opening.

Data recorded in column format on a card or identification badge having a width substantially identical to that of the standard tabulation card is read by insertion of the badge into the second opening of the card reader. The card reader is arranged to read data from a predetermined number of punched columns as the badge passes by the optical sensors in a direction opposite to the direction in which the tabulation card is pulled. The second opening and the adjoining region of the passageway are dimensioned to permit insertion of a relatively thick badge such as a plastic identification badge or card, or to permit insertion of a relatively thin record form such as a standard tabulation card. Hence, the second card opening is configured to accept a variety of record forms. Optical sensors, included within the array of data reading optical sensors, supply an electrical signal for the detection of the direction of card travel to detect whether a badge is being inserted in the second opening or a standard sized tabulation card is being pulled from the second opening.

In accordance with this invention, a badge or card inserted in the second card opening is prevented from passing more than a predetermined distance through the passageway by a badge stop mechanism that is located between the optical reading devices and the means for preventing a tabulation card from travelling in more than a single direction. The badge stop mechanism is arranged such that the leading edge of a badge inserted in the second card opening strikes the badge stop mechanism to prevent further movement along the passageway while simultaneously being arranged such that the movement of a tabulation card being pulled through the second opening is not impaired. In the preferred embodiment, the badge stop mechanism includes two spaced apart tapered ridges axially mounted along one surface of the passageway. A third axially extending tapered ridge is mounted on the second surface of the passageway in a position approximately midway between the first two ridges. Each ridge extends into the passageway and is contoured such that a tabulation card being pulled from the second opening is elastically deformed to pass by the ridges. The end face of each ridge nearestmost the second opening is substantially orthogonal to the surfaces of the passageway such that the leading edge of a badge inserted in the second opening comes into abutment with the end faces of the ridges.

The curved contour of the passageway, the means for preventing the multiple reading of data from a tabulation card and the badge stop mechanism are configured and arranged to exert frictional forces on a tabulation card as it is pulled through the passageway. These frictional forces enhance the operation of the card reader in that a definite force is required to pull the tabulation card from the second opening so that operation is effected only upon the application of a positive manual force. Further, the frictional forces exerted on the card tend to cause the card to be pulled through the passageway at a relatively constant speed such that electrical signals representative of each column of data are supplied at a relatively constant rate that is compatible with virtually any utilization device.

In the preferred embodiment the card reader passageway, the first and second card openings and the badge stop mechanism are defined by two plates injection molded of a thermoplastic material that are joined together in a superposed orientation. Each plate includes an arrangement of locking tabs positioned along the longitudinal edges thereof such that the plates interlock with one another without the use of conventional fasteners such as screws. The proper alignment of the two plates is effected by a metal plate which is inserted in a slot that is formed between the assembled plastic plates. The rollers that prevent reverse travel of the tabulation card and the optical reading devices mount within molded regions of the plates. These molded regions are arranged such that all component parts interlock or snap into place within the molded plates.

BRIEF DESCRIPTION OF THE DRAWING

FIG. 1 is a partially cut away perspective view of a card reader constructed in accordance with this invention and mounted within a convenient housing;

FIG. 2 is an exploded view of a card reader constructed in accordance with this invention;

FIG. 3 is a side elevation view of the upper and lower plates of the embodiment of FIG. 2 that illustrates the interlocking assemblage of the two plates;

FIG. 4 is a cross-sectional view of a card reader constructed in accordance with this invention and mounted within a housing unit;

FIGS. 5 and 6 are cross-sectional side views of a portion of the embodiment of FIG. 1 that illustrates the operation of the card reader to restrict the travel of a standard tabulation card to a single direction of movement;

FIG. 7 is a plan view, in partial cut away, of the embodiment depicted in FIG. 1; and FIG. 8 is a cross-sectional view taken at line 8—8 of FIG. 7 which illustrates the passage of a tabulation card through the badge stop mechanism.

DETAILED DESCRIPTION

Referring to FIG. 1, a card reader (denoted generally by the numeral 10) constructed in accordance with this invention is illustrated within a generally rectangular housing 12. Housing 12 is any convenient housing configured for containing the card reader 10 and can also be configured for containing any additional apparatus that may be used in conjunction with the card reader 10. For example, in some instances card reader 10 may be used in conjunction with electronic circuitry for performing mathematical calculations based on the data supplied by card reader 10.

In the depicted arrangement, the housing 12 includes a recessed card opening 14 extending transversely across the upper surface of the housing 12 near one end thereof. The card opening 14 is arranged for receiving punched cards such as standard tabulation cards having 80 columns and 12 rows for the recording of punched data. The card reader is mounted within the housing 12 to extend along the length of the housing between the card opening 14 and the second housing end wall 15. Preferably, the recessed opening 14 is rectangular in shape and includes four inwardly sloping walls 17 that form a converging rectangular throat for directing a card into the card reader 10. As a card is inserted into the opening 14, the card is directed into a first opening 16 of a slotted passageway 18 that is formed between an upper plate 20 and a lower plate 22 of card reader 10. Relative to the direction of card travel through the passageway 18, the passageway 18 first curves downwardly and then extends substantially parallel to the upper and lower surfaces of the housing 12 to a second card opening 24.

The second card opening 24 is formed between the upper plate 20 and lower plate 22 with the housing end wall 15 recessed or contoured to permit access to the opening 24. As is shown most clearly in FIG. 2, the portion of the upper plate 20 that is located nearestmost to the housing end wall 15 is shaped to form a recess 19 that permits the operator to grasp a card emerging from the card opening 24. More explicitly, as shown in FIG. 1, the upper plate 20 does not extend outwardly over the lower plate 22 at the housing end wall 15, but is notched or cut away to expose a portion of the upper surface of the lower plate 22. The lower plate 22 extends outwardly to join with the housing end wall 15 and the portion of the end wall 15 that is located above the upper surface of the exposed portion of the lower plate 22 is contoured to correspond to the notched recess 19 of the upper plate 20. Thus the lower plate 22 effectively forms a horizontal platform 21 extending outwardly to the housing end face 15 from the card opening 24 that is defined between the upper surface of lower plate 22 and the notched terminating end of the upper plate 20. Since the length of the passageway 18 is less than the longitudinal dimension of a standard tabulating card, a card inserted in the card opening 16 and pushed through the passageway 18 emerges from the card opening 24 with the end portion of the card lying on the platform 21. The card can then be easily grasped by the card reader operator and pulled from the opening 24.

An optical reading station 26, located adjacent to the second card opening 24 successively reads the data punched in each of the card columns as the card is pulled through the opening 24. As shall be described hereinafter, the optical reading station 26 includes a number of optical sources and optical sensors with the optical sources being disposed along the top plate 20 and the optical sensors being disposed along the bottom plate 22. The optical sources and optical sensors are mounted in alignment with one another and are spaced such that the data locations within each card column pass between an optical source and optical sensor element. When such a data location includes a punch or perforation, light energy is coupled between the associated optical source and sensor to cause the sensor to supply an electrical signal.

As a card which is to be read at the optical reading station 26 is pushed through the card reader opening 16, the card first passes through the curved portion of passageway 18 and then passes beneath two spring loaded rollers 28. As shall be discussed in detail relative to FIGS. 5 and 6, the spring loaded rollers 28 are arranged such that once the leading edge of the card has passed beneath the rollers, the card cannot be pulled back through the opening 16. Since the spring loaded rollers 28 ensure that the card can only be moved past the reading station 26 in a single direction, the "double reading" of the data recorded on the card is prevented. That is, since the card cannot be pulled back through the opening 16 after one or more columns of data are read at the reading station 26, previously read data columns cannot be moved past the reading station 26 in a reverse direction to generate erroneous output signals.

After passing beneath the spring loaded rollers 28, the leading edge of the card passes through a portion of the passageway 18 that may conveniently be identified as badge stop region 30. Badge stop region 30 is arranged to permit a card inserted in the card reader opening 16 to pass through the passageway 18 and be manually withdrawn from the opening 24 while simultaneously preventing a card or badge that is inserted through the card reader opening 24 from passing more than a predetermined distance through the passageway 18. As shall be described in more detail hereinafter, the badge stop region 30 is formed within a longitudinal section of passageway 18 wherein the upper plate 20 has an arcuate shaped longitudinal cross section. A badge stop ridge 32 is longitudinally mounted along the lower surface of the upper plate at the approximate center line of passageway 18 and two badge stop ridges 34 are longitudinally mounted along the upper surface of the lower plate 22 with a ridge 34 located between each edge of passageway 18 and the badge stop ridge 32. Ridges 32 and 34 are of increasing height relative to the direction of card travel when a card is pulled from the opening 24 with the end face 23 of each ridge nearestmost the opening 24 being greater than one half of the height of the passageway 18 at that location and being substantially perpendicular to the surface of the lower plate 22. The ends of ridges 32 and 34 nearestmost card opening 16 smoothly join the surfaces of the upper and lower plates (20 and 22, respectively). Since conventional tabulation cards are relatively flexible, the ridges 32 and 34 do not impair the passage of a card that is inserted in opening 16 and pulled from the opening 24. However, when a card or badge is inserted in opening 24 and pushed through the passageway 18, the leading edge of the card strikes the orthogonal faces 23 of the ridges 32 and 34 and is prevented from travelling further.

In view of this arrangement, it can be recognized that the card reader 10 is configured to read punched data from a card inserted in opening 16 and pulled from opening 24 or alternatively to read punched data from a card or badge that is inserted into the card reader opening 24. Further, in view of the described structure and the more detailed description contained hereinafter it will be recognized that the card reader 10 is configured such that frictional forces are exerted on a card as it is pulled through the passageway 18. More explicitly, the spring loaded rollers 28 and the arrangement of the badge stop region 30 each cause a card to be subjected to rather predictable frictional forces. Further, the curved portion of the passageway 18 causes such a card to frictionally contact at least a portion of the major boundary walls of the passageway 18 (i.e., the passageway boundaries defined by the lower surface of upper plate 20 and the upper surface of lower plate 22). These frictional forces regulate the force required to pull a card through the passageway 18. Since such frictional forces inherently increase as the pulling force is increased, the speed at which the card can be pulled from the card opening 24 tends to be maintained within a predetermined velocity range. Exercising some regulation over the speed at which the card can be pulled through the passageway 18 is advantageous in that the manual operation thereby requires a substantially constant operational force regardless of the normal variations in parameters such as the card thickness or composition of the card. Further, such speed regulation is advantageous in that the electrical signals representative of the information recorded in each card column are supplied at a rate that is compatible with essentially all systems utilizing punch card information.

Moreover, the curved shape of the passageway 18 is advantageous in that tabulation cards that have become somewhat bent or crumpled due to mishandling are straightened as the card is pushed through the passageway 18. Thus, such a card passes through the reading station 26 with the data columns in proper alignment with the optical sources and optical sensors.

Referring now to FIG. 2, it can be seen that each longitudinal edge of the upper plate 20 includes a locking rail 36 and each longitudinal edge of the lower plate 22 includes a locking rail 37. Preferably the locking rails 36 and 37 are formed as integral portions of the upper and lower plates 20 and 22. The upper plate locking rails 36 each include a number of locking tabs 38 and the lower plate locking rails 37 each include a number of locking tabs 40. The upper plate locking tabs 38 are L-shaped projections having one leg projecting orthogonally downward from the upper surface of the upper plate 20 and the second leg projecting longitudinally toward the curved end of upper plate 20. Similarly, the lower plate locking tabs 40 are L-shaped portions of the lower plate locking rails 37 having a first leg projecting orthogonally upward and a second leg projecting longitudinally away from the curved end of lower plate 22. Each locking tab 38 and 40 extends partially across a rectangular notch 44 in the edge of the locking rails 36 and 37. The notches 44 permit the locking tabs 38 and 40 to engage with one another to securely interlock the upper plate 20 with the lower plate 22.

Additionally, an elongate locking arm 46 is located along the longitudinal edges of each upper plate locking rail 36 adjacent to the curved region of the upper plate 20. The locking arms 46 are substantially colinear with the longitudinally extending legs of the locking tabs 38 and extend beyond the lower surface of the upper plate curved region. A triangular shaped protrusion 48 extends orthogonally outward from each lower plate locking rail 37 at a position within the lower plate curved region so as to engage the locking arms 46 when the upper and lower plates are joined together.

Upper plate 20 is formed such that each locking rail 36 extends downwardly to define a channel-like recess 50 in the lower surface of the upper plate between the two locking rails. The locking rails 37 of the lower plate 22 are recessed relative the remaining portion of the lower plate upper surface. The distance between the lower plate locking rails is established such that the upper surface of the lower plate 22 is positioned upwardly into the channel 50 to form one major boundary wall of the passageway 18 when the upper and lower plates are assembled. The second major boundary wall of the passageway 18 and each of the edge walls of the passageway 18 are formed by the boundary walls of the channel 50.

The portion of the recess 50 and the portion of the upper surface of lower plate 22 that form the card opening 16 are smoothly contoured such that the height dimension of the card opening 16 is greater than the height of passageway 18 in adjoining curved region. This contouring effectively forms a throat region adjacent to the card opening 16 so that a card can be easily inserted into the card opening 16 and directed through the passageway 18.

As is shown in FIG. 1, the locking tabs 38 and 40 are arranged to interlock with one another and the locking arms 46 are arranged to interconnect with the triangular projections 48 to thereby join upper plate 20 with the lower plate 22. More specifically, as depicted in FIG. 3, the upper plate 20 is joined to the lower plate 22 by inserting the upper plate locking arms 46 beneath the triangular projections 48 of the lower plate 22. The rectangular openings 44 that are located adjacent to the locking tabs 38 and 40 allow the upper plate 20 to be positioned directly over the lower plate 22. With the upper plate 20 superposed on lower plate 22, the upper plate 20 is slid along the lower plate such that the upper plate locking tabs 38 firmly engage with the lower plate locking tabs 40 and the upper plate locking arms 46 are retained by the lower surface of the triangular projections 48 of the lower plate 22.

To ensure the proper registration of the upper plate 20 relative to the lower plate 22, a rectangular registration plate 52 (FIG. 2) is inserted through a slot that is formed between the assembled upper plate 20 and lower plate 22. More specifically, the locking rails 36 of the upper plate 20 include a generally U-shaped region 54 projecting orthogonally downward from the lower surface of the upper plate 20. The U-shaped region 54 of the locking rails 36 is located immediately below a portion of the upper plate 20 that forms a mounting bracket 56 for the rollers 28 with the U-shaped region 54 being dimensioned such that the plate 52 fits tightly within rectangular slots 58 formed between the U-shaped region of the locking rails 36 and the lower surface of the roller mounting bracket 56. The lower plate 22 includes a registration slot 60 of a width substantially identical to the width of the registration plate 52. The slot 60 effectively divides the lower plate into two separate longitudinal sections with the two sections being joined together by the lower plate locking rails 37. The portion of the upper surface of each lower plate locking rail 37 that is contiguous with the slot 60 is recessed so that when the upper and lower plates are assembled the slot is aligned between the slots 58 of the upper plate 20. When the registration plate 52 is installed in this slot, the upper surface of the plate 52 and the adjacent upper surface of the lower plate 22 effectively form a continuous surface with the registration plate 52 properly orienting the lower plate 22 relative to the upper plate 20.

The roller mounting bracket 56 is preferably formed as an integral portion of the upper plate 20 and is arranged such that the rollers 28 rotate about an axis substantially perpendicular to the direction of card travel, i.e., a line perpendicular to the longitudinal center line of passageway 18. The rollers 28 are mounted on a spring wire 62 that is retained by the roller mounting bracket 56. The region of upper plate 20 contained within the roller mounting bracket 56 includes two rectangular openings 64 that allow the lower surface of each roller 28 to project through a rectangular opening 64 to contact the upper surface of the registration plate 52.

The roller mounting bracket 56 includes four walls that extend orthogonally upward from the upper surface of the upper plate 20 with the walls arranged for the mounting and retention of a rectangular plate 66. When mounted within the mounting bracket 56, the plate 66 forms an inclined plane relative to the lower surface of the upper plate 20. In this mounting arrangement, the upper surface of the rear wall 68 of the roller mounting bracket 56 is beveled downwardly with the rear wall 68 including a centrally located axial projection 70 that extends toward a forward wall 72 of the roller mounting bracket 56. The projection 70 tapers downwardly as it projects from the rear wall 68 toward the forward wall 72 with the upper surface of the projection 70 having the same angle of inclination (relative to the lower surface of the upper plate 20) as the beveled upper surface of the rear wall 68. The mounting bracket edge walls 74 are located adjacent to and substantially parallel with the locking rails 36 of the upper plate 20. When viewed in cross section, each edge wall 74 is substantially L-shaped with the uppermost region of each edge wall 74 extending inwardly toward the center of the upper plate 20. The lower surface of the projecting portion of each edge wall 74 is substantially parallel to the beveled surface of rear wall 68 (and the upper surface of the tapered projection 70) to support and retain the rectangular plate 66. Additionally, the lower portion of the roller mounting bracket forward wall 72 forms a shoulder 73 that projects toward the rear wall 68 with the upper surface of the shoulder 73 being coplanar with the beveled upper surface of the rear wall 68 and the upper surface of the rear wall projection 70. The shoulder 73 includes two tapered projections 76 with a projection 76 located between each edge wall 74 and the centrally located projection 70 of rear wall 68. Each tapered projection 76 extends toward the rear wall 68 with the rear surface of each tapered projection 76 being substantially orthogonal to the upper surface of the lower plate 20 and located immediately adjacent to one edge of the rectangular roller openings 64.

The inwardly projecting portions of edge walls 74 are spaced relative to the upper surface of the projections 70 and 76 and the upper surfaces of the wall 68 and 72 to form a slot 77 for retaining the plate 66. The edge walls 74 and the inwardly projecting uppermost portion thereof are dimensioned such that the plate 66 is tightly retained within the slots 77 of the mounting bracket 56. A rectangular post 78, located at the center of the rear boundary of rear wall 68 projects upwardly beyond the upper surface of the mounting bracket rear wall 68 such that the plate 66 is retained between the forward edges of the posts 78 and the rear surface of the forward wall 72.

Each roller 28 includes a hole along the axial center line through which the spring wire 62 is threaded. Prior to the insertion of plate 66 in the roller mounting bracket 58, the rollers are positioned in the rectangular openings 64 and the spring wire 62 is mounted between rectangular notches 80 located in the forward lower portion of each edge wall 74 of the roller mounting bracket 56. As can be seen most clearly in FIG. 7, each end of spring wire 62 projects outwardly through the notches 80 and the center portion of the spring wire 62 is positioned in a notch 82 formed between the mounting bracket rear wall axial projection 70 and the rear surface of the forward wall 72. With this arrangement the spring wire 62 biases the rollers 28 against the orthogonal rear faces of the forward wall projections 76. Referring to FIG. 5, when a card 84 is manually pulled from the opening 24, the rollers 28 rotate about the axis formed by spring wire 62 with the frictional contact between the rollers 28 and the card 84 causing deflection of the spring wire 62 such that the rollers move rearwardly in the rectangular roller openings 64. If, as is illustrated in FIG. 6, the operator attempts to pull the card 84 in the opposite direction (i.e., to pull the card back through the first opening 16 of card passageway 18), the frictional force between the card 84 and the rollers 28 cause the rollers to wedge between the upper surface of the card 84 and the lower surface of the plate 66 to firmly grip the card between the rollers 28 and the plate 52. Thus, the card 84 cannot be withdrawn through the opening 16 once the leading edge of the card has passed between the rollers 28. Since the leading edge of the card 84 passes beneath the rollers 28 prior to the reading of data from the card, each data column is read once and only once as the card is manually pulled from the card opening 24.

Referring again to FIG. 2, the passageway badge stop region 30 of FIG. 1 is formed by portions of the upper and lower plates (20 and 22) that are located adjacent to the roller mounting bracket 56 and between the roller mounting bracket 56 and the card opening 24. The portion of the upper plate 20 that forms the badge stop region 30 is convex in shape such that the height of the passageway 18 first smoothly increases relative to the direction of card travel and then smoothly decreases to the original passageway height. A badge stop ridge 32, preferably formed as an integral part of the upper plate 20, projects downward from the lower surface of the upper plate 20 along the approximate longitudinal center line of the upper plate 20. The badge stop ridge 34 is shaped similar to a section of a right circular cone with the apex of the cone smoothly converging with the forward edge of the concave contour of the upper plate 20 and the base of the conical section projecting orthogonally downward at approximately the midpoint of the convex portion of the upper plate 20. Preferably the badge stop ridge 32 is further dimensioned such that the outermost edge of the downwardly projecting surface is substantially coplanar with the lower surface of that portion of upper plate 20 beneath the roller support bracket 56.

Two badge stop ridges 34, shaped in the same manner as the upper plate badge stop ridge 32, are located on the upper surface of the lower plate 22 with the badge stop ridges 34 extending substantially parallel to the upper plate badge stop ridge 32. The badge stop ridges 34 are positioned such that when the upper and lower plates are joined, one of the ridges 34 is located between the upper plate badge stop ridge 32 and the edge walls of the card passageway 18 with the forward and rearward ends of the upper plate ridge 32 and the lower plate badge stop ridge 34 respectively located along a pair of parallel lines that are perpendicular to the longitudinal center line of the passageway 18. Thus as a card is inserted into the opening 16 of passageway 18 and pushed through the badge stop region 30, the card easily passes by the badge stop protrusions 32 and 34. As is depicted in the cross-sectional view of FIG. 8, when a card 84 passes through the badge stop region 30, the badge stops 32 and 34 exert forces on the card that cause the outer portions of the card to be deflected upwardly toward the lower surface of the upper plate 20 with the upper plate badge ridge 32 maintaining the central portion of the card 84 approximately coplanar with the lower surface of the regions of the upper plate 20 which lie outside the badge stop region 30. This deflection of the card 84 by the badge stop ridges 32 and 34 causes no permanent deformation of the card 84 since conventional data cards exhibit a degree of resilience that causes the card to return to an essentially flat condition once the card has passed through the badge stop region 30.

Referring to FIG. 7, it can be seen that a badge or card 85 that is inserted in the opening 24 for the reading of data therefrom will not pass through the badge stop region 30. As such a card or badge is inserted in the opening 24 and pushed inwardly through the passageway 18, the leading edge 87 of the badge or card 85 comes into abutment with the orthogonal faces 23 of the badge stop ridges 32 and 34. With the badge stop ridges dimensioned and arranged as described and depicted, such a badge or card 85 cannot be forced through the badge stop region 30 regardless of the thickness dimension or degree of flexibility exhibited by the card or badge. Thus, by appropriately positioning the badge stop ridges 32 and 34 relative to the position of the optical reading station 26, the card reader 10 is arranged to sequentially read a predetermined number of data columns from a badge or card inserted in opening 24 while simultaneously being arranged to sequentially read each data column of a conventional tabulation card that is inserted through card opening 16 and pulled through the passageway 18 by manually withdrawing the card through the card opening 24. For example, in one embodiment of the invention, the badge stop ridges 32 and 34 were positioned to accommodate the reading of an identification badge or other punched data record form having 10 data columns.

The capability of reading data presented on two differently sized cards has many advantages that will be apparent to those skilled in the art. For example, in many operations in which a card reader is utilized to transmit data to an electronic data processing system or other utilization device, it is often necessary or desirable that the identity of the person transmitting the data (or other information associated with the person transmitting the data) be supplied along with the data. In such a case the data can be read from a conventional tabulation card that is passed completely through the card reader 10 and the qualification data can be read from a second identification badge or card that is inserted in the opening 24. Further, it will be recognized that the configuration of the badge stop region 30 to halt the passage of either a thin card or a thicker badge inserted in opening 24 is a distinct advantage. First, it is advantageous to accommodate a relatively thick badge or card since those cards carried or worn for personnel identification are often relatively thick so that the badge or card will not become damaged during normal usage. Secondly, it is advantageous to accommodate a relatively thin card, such as a standard tabulation card, as well as the thicker badge or card to permit the use of a temporary card. For example, personnel identification cards, such as those used to identify the employees of a particular business, are often misplaced or left at home when the employee reports to work. Similarly, the need for a temporary badge may arise for any number of other reasons (e.g. to identify temporary employees or visitors). Since the card reader of this invention will operate equally well with a badge or thin paper type card, temporary identification badges may be easily and conveniently provided by conventional card punching apparatus such as a key punch machine.

Referring now to FIG. 2, the reading station 26 includes a plurality of optical sources 88 mounted on a printed circuit board 90 and a plurality of optical sensors 92 mounted on a printed circuit board 94. The printed circuit boards 90 and 94 are respectively mounted in an upper plate receptacle 96 and a lower plate receptacle 98. In the depicted embodiment, twelve optical sources 88, such as light emitting diodes, are mounted on one side of the printed circuit board 90 so as to project orthogonally therefrom. These 12 optical sources are mounted in alignment and spaced to correspond to the spacing of the twelve data rows of a conventional data card. Additionally, two optical sources 100 are similarly mounted on the printed circuit board 90 in longitudinal alignment with one another along each outside edge of the printed circuit board. These optical sources are utilized to determine the direction of card travel (i.e., whether a card is being pulled through passageway 18 from the opening 16 toward the opening 24 or whether a badge or card is being pushed into the opening 24). In the depicted embodiment, the electrodes of optical sources 88 pass through appropriately dimensioned holes in the printed circuit board 90 and are soldered to a metallized interconnection pattern 102 that electrically connects the optical sources 88 in parallel with one another. Thus, when an appropriate source of electrical potential (not shown) is applied between the electrical connections 104 that are connected to the metallization pattern 102, each optical source 88 is energized. Electrical connections 104 can be connected to an appropriate energy source such as a battery contained within the card reader housing 12, or the electrical connections 104 can be connected to a pair of wires within a cable 106 (FIG. 4) that passes through the card reader housing for connection with an appropriate energy source.

The optical sensors 92 are conventional photo-detection devices such as photodiodes or phototransistors that are sensitive to the light spectrum produced by the optical sources 88. The optical sensors 92 are mounted on the printed circuit board 94 in the same manner as the optical sources 88 are mounted on the printed circuit board 90. The metallization pattern of printed circuit board 94 is arranged such that the signal supplied by each sensor 92 is separately available for use with any conventional utilization device. In the depicted embodiment wherein photodiodes are utilized as optical sensors 92, one electrode of each optical sensor 92 is commonly connected to a common output terminal by the metallization pattern of printed circuit board 94. The second electrode 95 of each optical sensor 92 is electrically isolated from all other photosensor electrodes with the printed circuit board 94 arranged such that each of these electrodes is electrically connectable to the utilization device. In the arrangement depicted in FIG. 4, the second electrode 95 of each optical sensor 92 pass through an appropriately sized hole in the printed circuit board 94 and extends downwardly to serve as a connecting pin. These connecting pins mate with suitably arranged and sized sockets 97 mounted on a printed circuit board 112 that is located within the card reader housing 12 immediately below the card reader 10. Alternatively, the printed circuit board 94 can include a metallization pattern for electrically connecting the second electrodes of the optical sensors 92 to wires of cable 106 to couple the signals supplied by the optical sensors 92 to a utilization device remotely located from the housing 12.

In any case, when the printed circuit boards 90 and 94 are respectively mounted in the upper plate receptacle 96 and the lower plate receptacle 98 the optical sources 88 and the sensors 92 are oppositely disposed from one another along the upper and lower surfaces of the card passage 18. As each card column passes between the aligned source-sensor pairs, signals are generated by each sensor 92 that is in alignment with a card row having a punched hole or transparent region. Accordingly, as a punched card passes through the card reader, electrical output signals corresponding to a 12-bit digital word that is representative of the punched information in each column is produced with a sequence of such digital signals being supplied to correspond to the successive card columns.

Referring again to FIG. 2, the printed circuit board receptacle 96 of the upper plate 20 includes a wall 114 projecting orthogonally upward from the upper surface of the upper plate 20. The wall 114 is arranged to retain printed circuit board 90 and position the optical sources 88 in alignment with the data locations of a card passing through the card passageway 18. Preferably, the receptacle 96 is an integral part of the upper plate 20 with the wall 114 dimensioned to frictionally contact the edges of the printed circuit board 90. An aligned array of tubular shaped guides 116 is positioned along the portion of the upper surface of the upper plate 20 that lies within the receptacle 96 for receiving the optical sources 88. The tubular guides 116 extend upwardly from the upper surface of the upper plate 20 with a central opening 117 in each tubular guide 116 extending downwardly into the upper plate 20 to couple light energy emitted from each optical source 88 to a corresponding optical sensor 92.

Preferably, in the practice of this invention, the plates 20 and 22 are injection molded of a clear thermoplastic material of the polycarbonate variety. When such a clear plastic material is utilized, the central openings are molded into the upper plate 20 with the central openings 117 passing only partially through the upper plate 20. In this respect, it has been found advantageous to mold the central openings 117 such that a layer of clear plastic approximately 0.030 inches thick remains between lower termination of each central opening 117 and the lower surface of the upper plate 20. Such a layer of clear plastic does not cause appreciable diffusion of the light energy supplied by the optical sources 88 and prevents particulate matter that may be carried along with a card from entering into and blocking the central openings 117.

The receptacle 98 of the lower plate 22 is arranged in a similar fashion to the upper plate receptacle 96 with walls 118 extending orthogonally downwardy from the lower surface of the lower plate 22. Preferably the receptacle 98 is an integral portion of the lower plate 22 with the walls 118 being arranged to frictionally contact the edge of the optical sensor printed circuit board 94.

A rectangular mask 122 having an array of rectangular slit-like openings 124, spaced to correspond to the twelve data rows of a conventional data card, is mounted between the printed circuit board 94 and the lower surface of the lower plate 22. The mask 122 is constructed of opaque material and is retained within a rectangular recess 120 (FIGS. 5 and 6) on the lower surface of the lower plate 22. The recess 120 is preferably dimensioned such that a layer of clear plastic approximately 0.030 inches is formed between the upper surface of the lower plate 22 and the mask 122. Generally, each slit-like opening 124 in mask 122 is on the order of one-half the dimensions of the rectangular perforations commonly utilized as the perforations in a punched card or badge.

In the depicted arrangement, a small pin 126 projects downwardly from the lower surface of the lower plate 22 and passes through a small hole 128 in the central region of the mask 122 to insure proper registration of the mask 122 relative to the holes 120 of the lower plate 122. Because of the relatively small dimensions of the slit-like openings 124 and the alignment of the mask 122 with the optical sensors 92, each optical sensor supplies an electrical signal having relatively short signal rise and fall times. That is as a card passes through the passageway 18 and a perforation in one of the data locations passes between an aligned optical source 88 and optical sensor 92, only a short burst of light energy is coupled between the source 88 and the sensor 92. In response to this short burst of light energy, the associated optical sensor supplies an electrical signal of short time duration having a substantially rectangular waveshape.

Additionally, it has been found advantageous to provide small rectangular shaped recessed regions 130 in the upper surface of the lower plate 22 located in alignment with each opening 124 in the mask 122 and similarly shaped recesses in the lower surface of upper plate 20 in alignment with each of the central openings 117 that contain the optical sources 88. These small recesses 130 aid in preventing small particles of foreign matter that may be carried along the passageway 18 with a card or badge from accumulating within the reading station 26. Such an accumulation if not removed or prevented could cause the blockage of light between an adjacent optical source 88 and optical sensor 92, thereby causing erroneous output signals to be developed by the card reader 10.

Referring again to FIG. 2, rectangular wear plates 132, formed of metal sheet material, are located along each side of the lower plate 22 immediately adjacent to the reading station 26. The plates 132 are inserted in slots 134 that are positioned along the longitudinal edges of the lower plate 22 and fit into similar slots in the lower surface of the upper plate 20. The wear plates 132 form the outside walls of the card passageway 18 within the optical reading station 26 to insure that each card column will be in alignment with the optical sources and optical sensors and will not pass through the optical reading station 26 in a skewed orientation. Since the wear plates are constructed of metal, such proper alignment will exist for an extended period of usage. Further, the plates 132 in conjunction with the previously described arrangement of the registration plate 52 insure proper registration of the upper and lower plates 20 and 22.

In summary, it can be recognized that the card reader 10 of this invention comprises an upper plate 20 and a lower plate 22 arranged to interlock with one another so as to form a passageway having a first and second card opening. With this arrangement cards can be manually inserted into the first opening and manually withdrawn through the second opening for the reading of punched data, or alternatively a badge or card can be inserted in the second opening for the reading of punched data. It can be further recognized that the card reader 10 of this invention has no moving mechanical parts other than the spring loaded rollers 28 and, although the card reader comprises relatively few component parts, the interlocking arrangement and the previously described arrangement of the registration plate 52 and the wear plates 132 result in a card reader having both the required dimensional stability and the desired degree of ruggedness. Advantageously, this arrangement allows economical production of the card reader 10 in that upper and lower plates 120 and 122 can be formed of the previously mentioned clear thermoplastic material by conventional production techniques such as injection molding. The construction of the upper and lower plates of such thermoplastic material has been found to be further advantageous in that such materials exhibit a certain degree of flexibility or controlled deformation. This characteristic enhances the interconnection of the interlocking upper and lower plates and also allows the receptacles 96 and 98 and the roller mounting bracket 56 to be configured such that the printed circuit boards 90 and 94 and the plate 66 essentially snap into place during assembly of the card reader 10 and are rigidly retained therein.

It will be recognized by those skilled in the art that the embodiments depicted therein are exemplary in nature and that many variations can be effected without departing from the scope and spirit of this invention. For example, although the depicted embodiments are configured for the reading of punched data from cards, magnetically recorded data can be facilitated by the utilization of conventional magnetic detection apparatus utilized in place of the optical reading station 26.

What is claimed is:

1. A manual card reader for reading data recorded on a card comprising:

card guide means having defined therein first and second card openings and a slotted passageway having first and second oppositely disposed major boundary walls and first and second oppositely disposed minor boundary walls, said passageway being dimensioned for the passage of a card and interconnecting said first and second card openings, said passageway including a first region extending a predetermined distance from said first card opening and a second region inclined relative to said first region and extending between said first region and said second card opening, the inclination between said first and second regions of said passageway for causing a card inserted in said first card opening and manually pulled from said second card opening to frictionally contact at least a portion of said major boundary walls of said passageway; and data reading means for supplying an electrical signal representative of said data recorded on said card, said data reading means positioned along said slotted passageway in spaced proximity with said second card opening, said data reading means supplying said electrical signal as a card is manually moved through said passageway.

2. The card reader of claim 1 further comprising means for restricting the movement of a card inserted in said first opening and manually pulled from said second opening to prevent said card from being manually pulled back through said first opening after said card has passed a predetermined distance through said passageway, said movement restricting means including means for frictionally contacting said card when said card is pulled in the direction of said first opening to prevent movement of said card, said movement restricting means being arranged to extend into said passageway at a position between said first card opening and said data reading means to prevent multiple reading of the data recorded on a card manually inserted in said first opening.

3. The card reader of claim 1, wherein the longitudinal cross-sectional geometry of said first passageway region is arcuately shaped to define a curved passageway extending between said first card opening and said second passageway region, said second passageway region defining a substantially straight path between said first passageway region and said second card opening.

4. The card reader of claim 1, wherein said card guide means comprises a first and second plate, said first and second plate including means for interlocking said first and second plate with one another in a superposed orientation, said interlocking means positioned along each longitudinal edge of said first and second plates, said first plate including a channel for forming said first major boundary wall of said slotted passageway and both of said minor boundary walls of said passageway, said channel extending longitudinally between the end surfaces of said first plate and extending transversely across said first plate between the interlocking means of said first plate, that portion of said second plate between said second plate interlocking means extending inwardly into the opening of said channel for forming said second major boundary wall of said slotted passageway.

5. The card reader of claim 1 wherein said second card opening is configured and arranged for the insertion of a card for the reading of data recorded thereon, said card reader further comprising means for limiting the travel of a card inserted in said second card opening to a predetermined distance along said slotted passageway, said travel limiting means extending into said passageway at a position between said data reading means and said first region of said slotted passageway, said travel limiting means being configured and arranged to abut with the leading edge of a card inserted in said second card as said card is pushed through said passageway, said travel limiting means being further configured and arranged to permit the passage of a card inserted in said first card opening and manually pulled from said second card opening.

6. The card reader of claim 5 wherein said card guide means comprises a first and second plate, said first and second plate including means for interlocking said first and second plate with one another in a superposed orientation, said interlocking means positioned along each longitudinal edge of said first and second plates, said first plate including a channel for forming said first major boundary wall of said slotted passageway and both of said minor boundary walls of said passageway, said channel extending longitudinally between the end surfaces of said first plate and extending transversely across said first plate between the interlocking means of said first plate, that portion of said second plate between said second plate interlocking means extending inwardly into the opening of said channel for forming said second major boundary wall of said slotted passageway.

7. The card reader of claim 6 wherein said first and second plates include integral means for forming said gions of said passageway, said length of first said plate including a predetermined length wherein the depth of said channel is increased to define a region of said passageway having a greater height than surrounding regions of said passageway, said length of first plate wherein said channel depth is increased including a first tapered ridge extending longitudinally along the central region of said channel, that end of said first tapered ridge nearestmost said first card opening smoothly contoured to join the surface of said channel that forms said first major boundary wall of said passageway, said first ridge tapered to project inwardly into said region of said passageway having said increased height with the height dimension of said tapered ridge increasing relative to the direction of card travel when a card is pulled from said second opening, the end face of said first ridge located nearestmost to said data reading means being substantially orthogonal to the surface of said channel that forms said first major boundary wall of said passageway, said second plate including a second and third tapered ridge extending longitudinally along said passageway, one of said second and third tapered ridges being located between said first tapered ridge and each of said minor boundary walls of said passageway, the end faces of said second and third tapered ridges nearestmost said first opening smoothly contoured to join said second major boundary wall of said passageway, the end faces of said second and third ridges nearestmost to said data reading means being substantially orthogonal relative to said second major boundary wall of said passageway, said orthogonal end faces of said second and third ridges being substantially coplanar with said orthogonal end face of said first ridge, said orthogonal end faces of said first, second and third ridges stopping a card inserted in said second card opening from further travel toward said first card opening.

8. The card reader of claim 6 further comprising means for restricting the movement of a card inserted in said first opening and manually pulled from said second card opening to prevent said card from being manually pulled back through said first opening after said card has passed a predetermined distance through said slotted passageway, said movement restricting means including means for frictionally contacting the surface of said card when said card is pulled toward said first opening to prevent movement of said card, said movement restricting means mounted to extend into said passageway at a position between said first card opening and said means for limiting the travel of the card inserted into said second card opening.

9. The card reader of claim 8 wherein said means for frictionally contacting the surface of said card is rotatable about an axis perpendicular to said minor boundary walls of said passageway when said card is manually pulled from said second card opening, said movement restricting means further including means for preventing the rotation of said rotatable means for frictionally contacting the surface of said card when said card is pulled toward said first opening to prevent movement of said card.

10. The card reader of claim 8 wherein said movement restricting means comprises at least one cylindrical roller having an opening through said roller along the axial center line thereof, a spring wire and a third plate, said spring wire passing axially through each of said rollers and mounted to said first plate to position the axial center line of each of said rollers substantially perpendicular to the direction of card travel through said passageway, said first plate including openings in said first major boundary wall of said slotted passageway for positioning each of said rollers with the surface thereof extending into said slotted passageway for contacting the surface of a card manually pulled through said passageway, said third plate mounted to form an inclined plane relative to said first major boundary wall of said slotted passageway, said axial center line of said rollers being substantially parallel to one surface of said third plate, said inclined plane being dimensioned and arranged to extend angularly over said rollers for frictionally contacting said rollers when a card is pulled toward said first card opening, said frictional contact forces preventing rotation of said rollers about said spring wire and causing said rollers to frictionally contact said card for preventing movement of said card toward said first card opening, said rollers rotating freely when said card is pulled toward said second opening.

11. The card reader of claim 10 wherein said first and second plates define a transverse slot when said first and second plates are interlocked and in proper alignment with one another, said card reader further comprising an alignment plate dimensioned for insertion in said transverse slot for maintaining said first and second plates in alignment with one another.

12. The card reader of claim 11 wherein said data is recorded on said card in a coded sequence of the perforations arranged columnwise on said card, said data reading means including a linear array of optical sources transversely mounted along said first major boundary wall of said passageway, said data reading means further including a linear array of optical sensors transversely mounted along said second major boundary wall of said passageway, said optical sources and said optical sensors spaced along said first and second passageway boundary for forming oppositely disposed source-sensor pairs detecting the perforations on said card as said card is moved through said passageway.

13. The card reader of claim 12, wherein said data reading means further includes means for detecting the direction in which a card is moving through said passageway to determine when a card is being inserted in said first opening and to determine when a card is being inserted in said second opening, said direction detecting means including at least two optical sources and at least two optical sensors, said optical sources being mounted in alignment with one another along one of said first and second major boundary walls of said passageway and spaced apart from one another relative to the direction of card travel through said passageway, said optical sensors being mounted in alignment with one another along the other of said first and second major boundary wall of said passageway and mounted relative to said optical sources for defining at least two source-sensor pairs for detecting the passage of the leading edge of a card travelling through said passageway.

14. The card reader of claim 13, wherein said first plate includes first receptacle means for receiving and containing said array of said optical sources, said first receptacle means including a plurality of openings for the insertion of each of said optical sources to position said optical sources in alignment with the data locations in a data column of a card moving through said passageway, said second plate further including a second receptacle means for receiving and containing said array of said optical sensors, said second receptacle means including a plurality of openings for the insertion of said optical sensors to position said optical sensors in alignment with said data locations of a data column of a card moving through said passageway.

15. The card reader of claim 14, further comprising first and second printed circuit boards, said first printed circuit board for mounting said optical sources in said aligned orientation, said first printed circuit board including electrical interconnections connectable to an electrical supply source for energizing each of said optical sources, said second printed circuit board for mounting said optical sensors in said aligned orientation, said second printed circuit board including electrical interconnections for coupling the electrical signal supplied by each of said optical sensors to a utilization device for using the data recorded on said card, said first and second printed circuit boards each dimensioned for insertion into said first and second receptacles of said first and second plates.

16. A card reader for reading coded data punches arranged in columns on a card wherein said card reader includes first and second card openings interconnected by a passageway, said card reader operable for reading data from a card manually inserted in said first card opening and pulled from said second card opening and operable to read data from a card inserted in said second card opening, said card reader comprising:
first and second plate means, said first and second plate means configured and arranged for interlocking with one another to define said first and second card openings and said passageway, said passageway formed by said first and second plate means including a region immediately adjacent said first card opening wherein said passageway curves smoothly downward and toward said second card opening, said passageway forming an essentially uniplanar passage extending from said curved region to said second card opening; and means for optically detecting said data punches in said card as a card is manually moved through said passageway, said optical detection means being positioned along said passageway between said first and second card openings.

17. The card reader of claim 16, further comprising means to restrict the movement of a card inserted into said first card opening for insuring that the data columns of the card pass by said optical direction means only by manually pulling the card through said second card opening, said movement restricting means being positioned between said first card opening and said optical detecting means, said movement restricting means including means for frictionally engaging the surface of said card when said card is pulled toward said first opening.

18. The card reader of claim 16, further comprising badge stop means for limiting the travel of a card inserted in said second card opening to permit the card to travel a predetermined distance along said passageway, said badge stop means including means for contacting the leading edge of a card inserted in said second opening and pushed through said passageway, said badge stop means being positioned a predetermined distance along said passageway from said second card opening.

19. The card reader of claim 16 further comprising registration means for insuring the proper alignment of said first and second plates when said first and second plates are interlocked with one another, said first and second plates configured and arranged to define a rectangular slot transversely oriented relative to said passageway when said first and second plates are in substantial alignment with one another, said registration means including a rectangular plate dimensioned for insertion in said rectangular slot to maintain said first and second plates in said aligned orientation.

20. The card reader of claim 17 wherein said card movement restricting means includes at least one cylindrical roller, the surface of said roller contacting the upper surface of the card inserted in said first card opening and pulled from said second card opening, said roller being freely rotatable about an axis substantially parallel with the data columns of a card travelling through said passageway when the card is pulled from said second card opening, said card movement restricting means further including an inclined plane enclosing said cylindrical roller within an acute angle formed between the upper surface of said second plate and the lower surface of said inclined plane, said inclined plane positioned for preventing rotation of said roller and forcing said roller downward against the card to prevent movement of the card whenever a force is exerted on the card to withdraw the card through said first card opening.

21. The card reader of claim 20 wherein said first plate means includes integral means for mounting said card movement restricting means, said integral mounting means including means for receiving and retaining said inclined plane, said card movement restricting means including a spring wire and first and second rollers having openings along the axial center line thereof, said spring wire passing through said axial openings of said first and second rollers, said integral mounting means further including means for retaining said spring wire and first and second rectangular openings between the upper and lower surfaces of said first plate means, said spring wire being retained with said first and second rollers projecting through said first and second openings for contacting the surface of a card travelling through said passageway.

22. The card reader of claim 18 wherein said badge stop means is formed by integral portions of said first and second plate means, said integral portion of said first plate means including means for arcuately contouring a first surface of said passageway in a direction perpendicular to the direction of card travel, said first plate means further including a first protrusion centrally positioned wthin said arcuate surface and extending longitudinally from a first edge of said arcuate surface toward the second edge thereof, said protrusion smoothly joining said first edge of said arcuate surface, said protrusion of increasing height relative to the direction of card travel when a card is pulled from a second card opening, the end face of said first protrusion located nearestmost to said second card opening being substantially orthogonal to a second surface of said passageway that is oppositely disposed relative to said first surface of said passageway, said integral portion of said second plate means for forming said badge stop means including a second and third protrusion, said second and third protrusions being longitudinally disposed along said second surface of said passageway, said second and third protrusions being respectively positioned between said first protrusion and each edge boundary of said passageway, said second and third protrusions contoured to smoothly join said second surface along that end of said second and third protrusion nearestmost to said first opening, said second and third protrusion of increasing height relative to the direction of travel of a card that is pulled from said second opening, the end faces of said second and third protrusion nearestmost said second card opening being orthogonal to said second surface of said passageway and extending toward said arcuate shaped surface of said first plate means, said orthogonal end faces of said first, second and third projections substantially coplanar with one another for abutting the edge of a card inserted into said passageway through said second card opening.

23. The card reader of claim 16 wherein said optical detecting means includes a plurality of light emitting diodes mounted in alignment across a first surface of said passageway, and a plurality of photosensitive semiconductor devices, said plurality of photosensitive semiconductor devices mounted in alignment across a second surface of said passageway, said second passageway surface being oppositely disposed relative to said first passageway surface, said plurality of light emitting diodes and said plurality of photosensitive devices being arranged in a predetermined number of pairs for detecting perforations in the row locations of each data column of a card manually moved past said optical detecting means.

24. The card reader of claim 23 further including first and second printed circuit boards for respectively mounting said plurality of light emitting diodes and said plurality of photosensitive semiconductor devices, each of said first and second printed circuit boards including metallization patterns for electrically interconnecting said light emitting diodes and said photosensitive semiconductor devices, said metallization pattern of said first printed circuit board connectable to a source of energy for activating said light emitting diodes, said metallization pattern of said second printed circuit board including means for connecting each of said photosensitive semiconductor devices to a utilization device for using said data recorded on said card.

25. The card reader of claim 24 wherein said first and second plate means respectively include integral mounting means for receiving and retaining said first and second printed circuit cards to maintain said light emitting diodes and said photosensitive semiconductors in said aligned orientation.

* * * * *

UNITED STATES PATENT AND TRADEMARK OFFICE
CERTIFICATE OF CORRECTION

PATENT NO. : 4,036,430

DATED : July 19, 1977

INVENTOR(S) : Helmut Eppich

It is certified that error appears in the above–identified patent and that said Letters Patent are hereby corrected as shown below:

Claim 7, Column 16, line 37, delete the line entirely and insert therefor —travel limiting means, said channel of said first plate—;

Claim 7, Column 16, line 41, before "first" insert —said—.

Claim 22, Column 20, line 15, delete "wthin" and insert —within—.

Signed and Sealed this

Twenty-second Day of November 1977

[SEAL]

Attest:

RUTH C. MASON
Attesting Officer

LUTRELLE F. PARKER
Acting Commissioner of Patents and Trademarks